US008814122B2

(12) United States Patent
Couasnon

(10) Patent No.: US 8,814,122 B2
(45) Date of Patent: Aug. 26, 2014

(54) SLIDE RAIL FOR MOTOR VEHICULE SEAT

(71) Applicant: FAURECIA Sieges d'Automobile, Nanterre (FR)

(72) Inventor: Christian Couasnon, Flers (FR)

(73) Assignee: FAURECIA Sieges d'Automobile, Nanterre (FR)

( * ) Notice: Subject to any disclaimer, the term of this patent is extended or adjusted under 35 U.S.C. 154(b) by 41 days.

(21) Appl. No.: 13/645,106

(22) Filed: Oct. 4, 2012

(65) Prior Publication Data
US 2013/0087674 A1 Apr. 11, 2013

(30) Foreign Application Priority Data
Oct. 11, 2011 (FR) ..................... 11 59193

(51) Int. Cl.
F16M 13/00 (2006.01)
(52) U.S. Cl.
USPC ............... 248/429; 324/207.13; 74/89.14; 296/65.12
(58) Field of Classification Search
USPC ............ 248/429, 430; 74/89.14; 324/207.26, 324/207.13, 207.24; 340/686.1; 296/65.12, 296/65.13, 65.15
See application file for complete search history.

(56) References Cited

U.S. PATENT DOCUMENTS

| 4,802,374 | A  | * | 2/1989  | Hamelin et al. | 74/89.14 |
| 4,949,931 | A  | * | 8/1990  | Fujiwara et al. | 248/429 |
| 5,259,257 | A  | * | 11/1993 | Mouri | 248/429 |
| 6,499,712 | B1 | * | 12/2002 | Clark et al. | 248/429 |
| 6,626,064 | B1 | * | 9/2003  | Maue et al. | 74/665 F |
| 6,851,655 | B2 | * | 2/2005  | Kume et al. | 248/429 |
| 6,854,782 | B2 | * | 2/2005  | Reichert et al. | 296/65.13 |
| 6,971,620 | B2 | * | 12/2005 | Moradell et al. | 248/422 |
| 7,048,244 | B2 | * | 5/2006  | Hauck | 248/430 |
| 7,147,261 | B2 | * | 12/2006 | Ventura et al. | 296/65.13 |
| 7,195,261 | B2 | * | 3/2007  | Yoshida et al. | 280/735 |
| 7,303,223 | B2 | * | 12/2007 | Nakamura et al. | 296/65.15 |
| 7,322,605 | B2 | * | 1/2008  | Ventura et al. | 280/735 |
| 7,325,851 | B2 | * | 2/2008  | Ito et al. | 296/65.13 |
| 7,330,008 | B2 | * | 2/2008  | Lee et al. | 318/466 |

(Continued)

FOREIGN PATENT DOCUMENTS

| GB | 2 396 944     | 7/2004 |
| JP | 2001 130369   | 5/2001 |
| WO | WO 2009/035431 | 3/2009 |
| WO | WO 2009/066560 | 5/2009 |

OTHER PUBLICATIONS

French Search Report from corresponding French Patent Application No. FR 1159193 Report Dated May 30, 2012.

Primary Examiner — Terrell McKinnon
Assistant Examiner — Daniel J Breslin
(74) Attorney, Agent, or Firm — Miller, Matthias & Hull LLP

(57) ABSTRACT

A slide rail for motor vehicle seat comprising a first profile section, attached to said vehicle, with a cross-section having a bottom and two side parts, a second profile section, guided translationally relative to the first profile section along the longitudinal axis, the second profile section having a cross-section with a web and first and second side flanges, a fixed motorization element connected to the first profile section, a movable motorization element connected to the second profile section, a sensor attached to the second profile section, the sensor being suitable for detecting the presence of the fixed motorization element when the sensor is opposite a portion of the fixed motorization element.

8 Claims, 4 Drawing Sheets

(56) References Cited

U.S. PATENT DOCUMENTS

| | | | |
|---|---|---|---|
| 7,511,479 B2 * | 3/2009 | Schuler et al. | 324/207.2 |
| 7,521,924 B2 * | 4/2009 | Okumura et al. | 324/207.24 |
| 7,564,234 B2 * | 7/2009 | Endoh et al. | 324/207.24 |
| 7,614,597 B2 * | 11/2009 | Matsumoto et al. | 248/429 |
| 7,812,600 B2 * | 10/2010 | Ito et al. | 324/207.25 |
| 7,999,539 B2 * | 8/2011 | Nishide | 324/207.26 |
| 8,038,197 B2 * | 10/2011 | Koga | 296/65.18 |
| 8,548,687 B2 * | 10/2013 | Jefferies et al. | 701/45 |
| 2002/0125396 A1 * | 9/2002 | Kume et al. | 248/429 |
| 2004/0100388 A1 | 5/2004 | Yoshida et al. | |
| 2004/0196029 A1 | 10/2004 | Okumura et al. | |
| 2007/0069100 A1 * | 3/2007 | Schuler et al. | 248/430 |
| 2009/0051356 A1 | 2/2009 | Nishide | |
| 2010/0051776 A1 * | 3/2010 | Koga et al. | 248/429 |
| 2010/0242650 A1 * | 9/2010 | Koga et al. | 74/416 |
| 2010/0320352 A1 * | 12/2010 | Weber | 248/429 |
| 2011/0017897 A1 * | 1/2011 | Christoffel et al. | 248/429 |
| 2011/0022274 A1 | 1/2011 | Jefferies | |
| 2012/0018608 A1 * | 1/2012 | Nishide et al. | 248/429 |

* cited by examiner

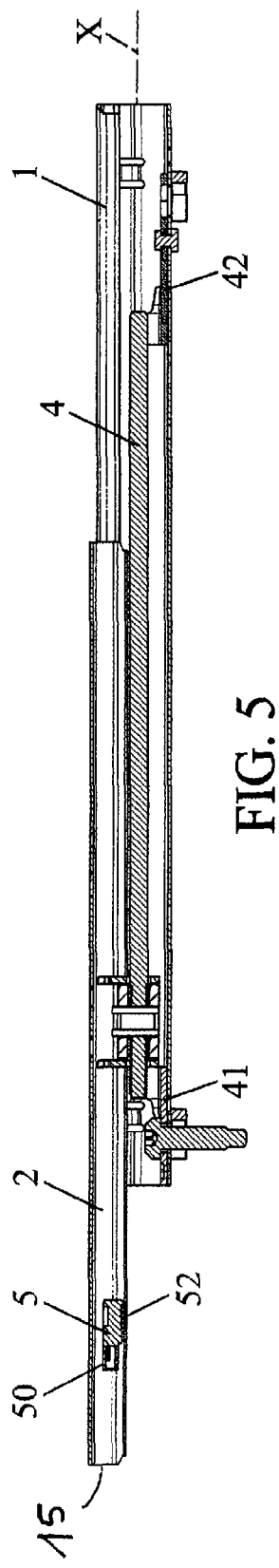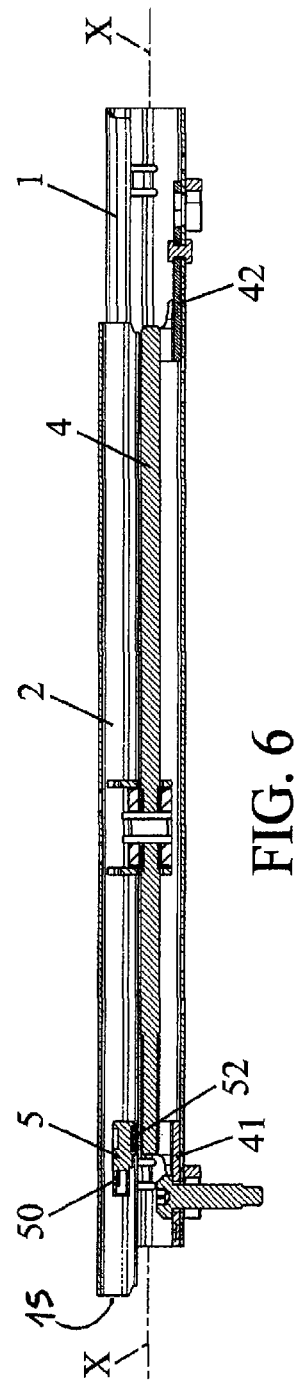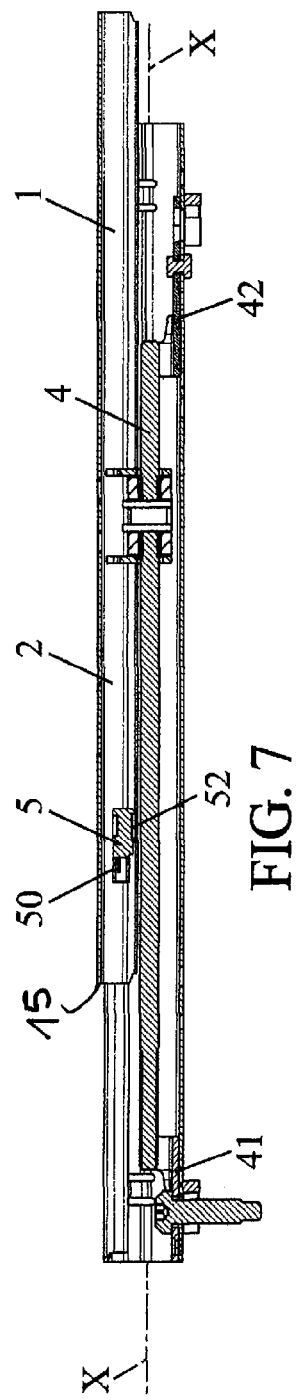

SLIDE RAIL FOR MOTOR VEHICULE SEAT

CROSS-REFERENCE TO RELATED APPLICATIONS

This application claims priority under 35 USC §119 and the Paris Convention to French Patent Application No. FR 11 59193, filed on Oct. 11, 2011.

FIELD OF THE DISCLOSURE

This invention relates to slide rails for motor vehicle seats.

BACKGROUND OF THE DISCLOSURE

It relates more particularly to a seat slide rail comprising:
a first profile section, intended to be attached to said vehicle, extending along a longitudinal axis, said first profile section having a cross-section with a bottom and two side parts,
a second profile section, guided translationally relative to the first profile section and able to move relative to said first profile section along the longitudinal axis, said second profile section having a cross-section with a central part with a U-shape open toward the bottom of the first profile section, having a web and first and second side flanges,
a sensor attached to the second profile section.

Such slide rails for motor vehicles seats are already known, for example from document US2009/051356, which presents a slide rail provided with a detection sensor for detecting the position of a locking plate.

However, such a system is not compatible with motorized slide rail systems. In addition, the sensor has a large footprint and is difficult to integrate into the environment of the slide rail.

SUMMARY OF THE DISCLOSURE

The purpose of the present invention is to improve slide rails, and motorized slide rails in particular, in order to improve the integration of the position detection function.

To that end, according to the invention, a slide rail of the type in question comprises:
a fixed motorization element connected to the first profile section, the fixed motorization element being a helical screw,
a movable motorization element connected to the second profile section, cooperating with the fixed motorization element,
and the sensor is suitable for detecting the presence of the fixed motorization element when said sensor is opposite a portion of the fixed motorization element.

The integration is improved with these arrangements, particularly in the case of motorized slide rails, and the detection function is optimized in terms of the number of parts and the mechanical protection.

Further, the direct detection of the helical screw is a particularly simple, efficient and reliable solution.

In various embodiments of the invention, it is possible to also use one or more of the following arrangements:
the sensor is entirely contained within an inner space of the second profile section, said inner space being delimited by said web and the first and second side flanges, such that the sensor is protected from mechanical impact and splashing fluids;
the sensor is attached near the front end of the second profile section, whence it is easy to install and easy to connect electrically;
the movable motorization element is a captive nut rotated by a drive mechanism, which is a very reliable and quiet complementary solution to the helical screw;
the helical screw is arranged at a distance from the bottom of the first profile section and the sensor comprises a sensitive part capable of detecting the upper portion of the helical screw, by means of which the vertical arrangement of the helical screw and sensor is optimized for a motorized slide rail;
the sensor is a Hall effect sensor or an inductive proximity sensor;
the sensor comprises a connection oriented in parallel to the longitudinal axis, and the connection is located within the inner space delimited by said web and the first and second side flanges, such that the sensor and its electrical connection are well protected against mechanical stresses and exposure to fluids;

The subject of the invention is also a motor vehicle seat comprising at least one slide rail as described above.

BRIEF DESCRIPTION OF THE DRAWINGS

Other features, aims, and advantages of the invention will become apparent on reading the following description of one of its embodiments, given as a non-limiting example. The invention will also be better understood from the accompanying drawings wherein:

FIG. 5 is a longitudinal sectional view of the slide rail from FIG. 1, the seat being in the forward position, FIG. 6 is a longitudinal sectional view of the slide rail from FIG. 1, the seat being in an intermediate position, FIG. 7 is a longitudinal sectional view of the slide rail from FIG. 1, the seat being in the rearward position.

DETAILED DESCRIPTION OF THE DISCLOSURE

Figure 1:
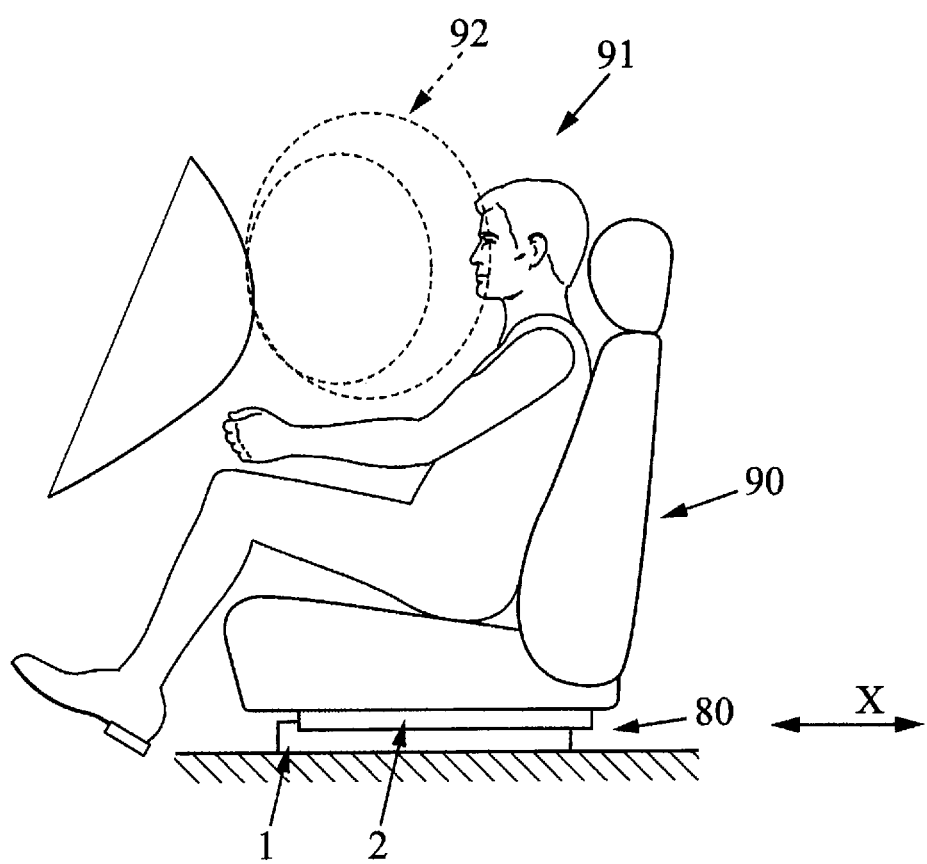
FIG. 1 is schematic side view of a motor vehicle seat with an occupant.
Figure 2:
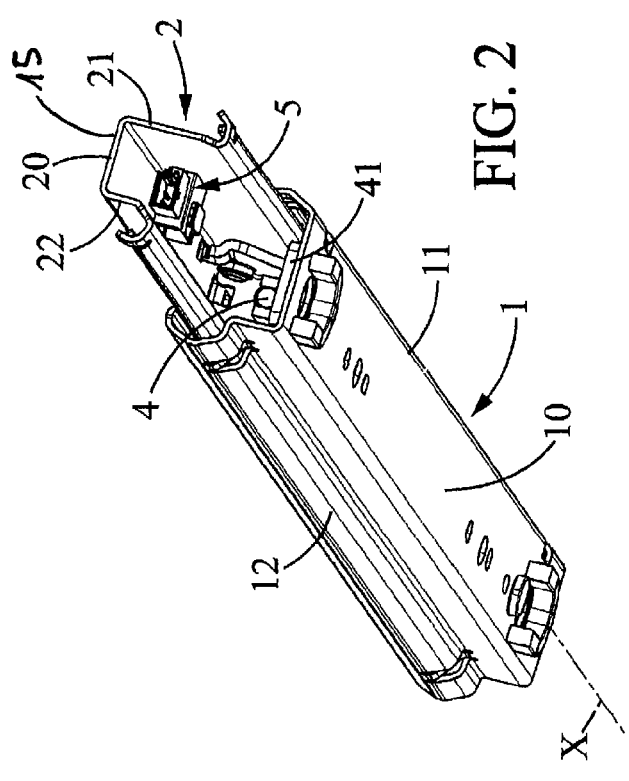
FIG. 2 is a bottom perspective view of the seat slide rail from FIG. 1.
Figure 3:
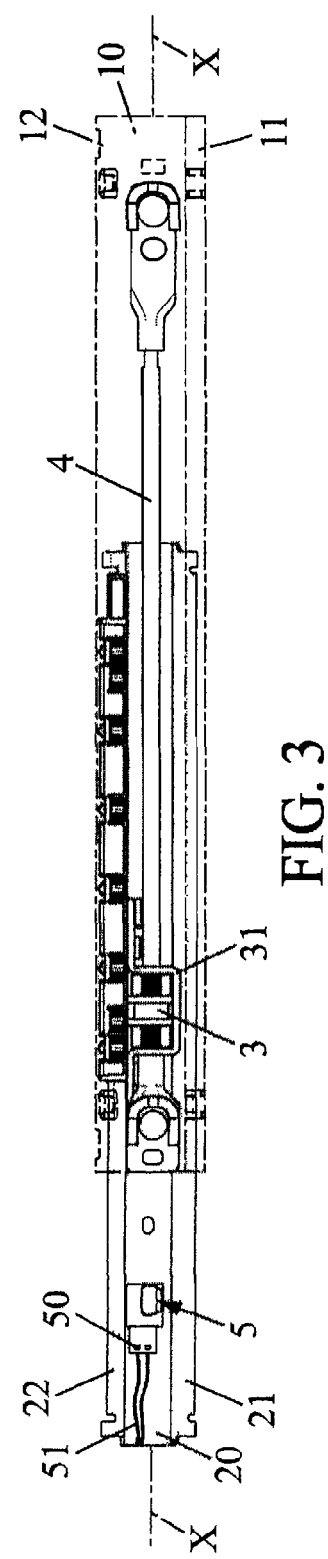
FIG. 3 is a bottom view of the seat slide rail from FIG. 1, with the fixed profile section being depicted as transparent.

FIG. 1 shows a schematic side view of a motor vehicle seat 90 with an occupant 91 sitting in it. The seat 90 in question may be a front seat of a vehicle or a rear seat.

As known in the art, the seat is connected to the vehicle floor using slide rails 80 which allow adjusting the longitudinal position of the seat in a longitudinal direction marked 'X,' in order to adapt to the girth and/or preferred positions of the occupant.

It is also common to protect said seat occupant 91 with an inflatable protection device such as an airbag 92 that can be deployed from the dashboard or steering wheel of the vehicle in the event of an accident. In addition, it is known to be able to trigger a limited bag volume in the event the seat is in a forward position and, conversely, to trigger inflation of a greater bag volume when the seat is in a middle or rearward position; this improves the balance between adequate protection and reduced risk of injury due to the sudden inflation of the bag when triggered.

As may be seen in FIGS. 1 to 4, a slide rail 80 comprises a first profile section 1 called a fixed profile section, intended to be attached to the vehicle floor, which extends in the longitudinal direction X, and a second profile section 2 called a movable profile section, mounted and guided translationally relative to the first profile section and able to move relative to the first profile section along the aforesaid longitudinal axis X.

Figure 4:
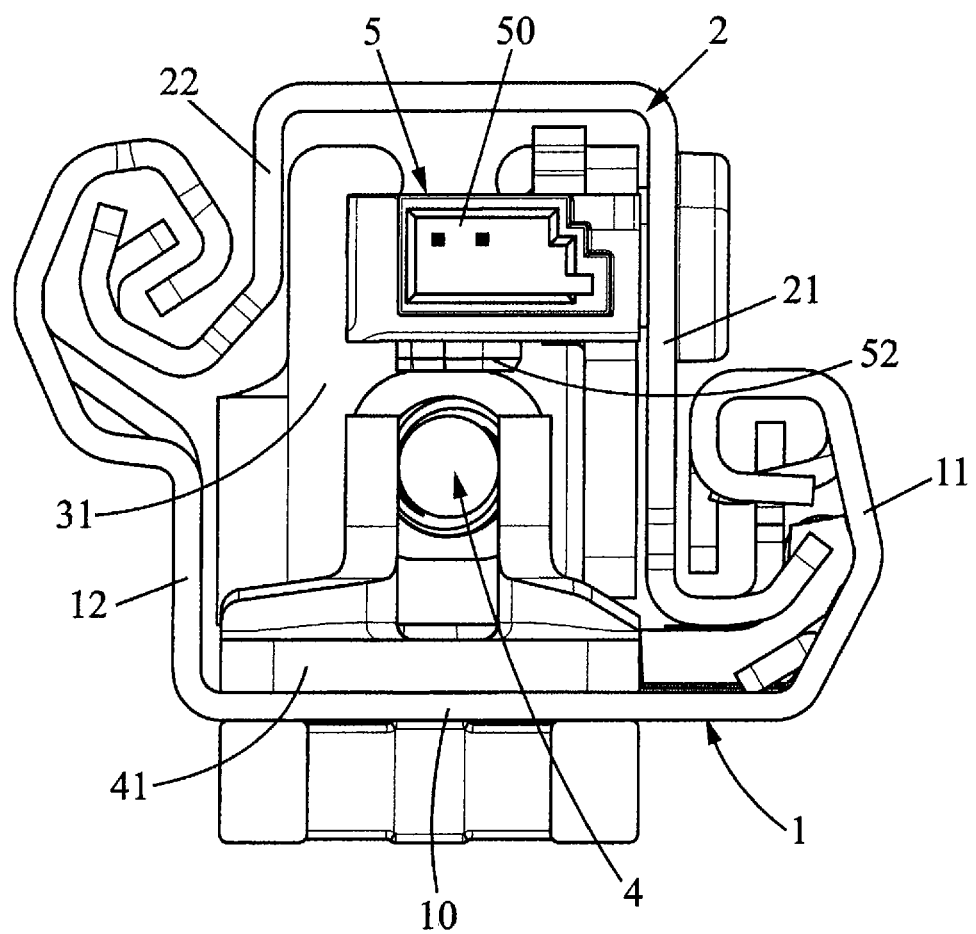
FIG. 4 is an end view of the slide rail from FIG. 1.

The first profile section 1 is attached to the floor by known means of attachment that are not described in detail here. This first profile section has a cross-section comprising a central part 10 also called the bottom 10 and two side parts 11,12 that extend upward on either side of the aforesaid bottom. The two side parts can be supplemented by curved parts as illustrated in FIG. 4 or by straight parts.

The second profile section 2 also has a cross-section that is a general U-shape with the opening toward the bottom, meaning it is open toward the bottom of the cross-section of the first profile section 1; this cross-section of the second profile section comprises a web 20 substantially parallel to the bottom 10 of the cross-section of the first profile section and the first and second side flanges 21, 22, which extend orthogonally from the web 20 towards the bottom of the first profile section. Ball bearings or rolling-element bearings (not illustrated) minimize the friction, as the second section 2 is guided relative to the first profile section 1.

The slide rail 80 illustrated here is a motorized slide rail, meaning that the second profile section 2 is moved relative to the first profile section 1 by the action of an electric motor (not shown) and transmission means (not shown) that drive a movable motorization element 3, which, in the example illustrated here, is in the form of a rotating captive nut in a housing 31.

This movable motorization element 3 cooperates, by engagement, with a fixed motorization element 4 integrally connected to the first profile section 1, which, in the example illustrated here, is in the form of a helical screw immobilized relative to the first profile section by two mounting feet 41, 42 respectively located at either end of the helical screw 4. When the captive nut 3 is rotated, it travels along the helical screw 4 and thus moves along the longitudinal axis X, carrying with it the housing 31 and, therefore, the entirety of the second profile section 2.

As illustrated in particular in FIG. 4, the helical screw 4 is arranged at a distance from the bottom of the first profile section in order to leave sufficient space for the nut 3 which surrounds the helical screw 4.

It should be noted that the helical screw 4 extends over practically the entire length of the first profile section, but it could be otherwise.

Furthermore, the helical screw could be replaced by another form of fixed motorization element, such as a toothed rack attached to the bottom of the first profile section 1, or any other means enabling a movable motorization element to exert displacement force on the second profile section 2 relative to the first profile section 1. Similarly, the movable motorization element 3 could be a different form than a rotating captive nut, such as a pinion drive gear or any other equivalent solution.

Advantageously according to the invention, a detection sensor 5 is attached to the second profile section 2; in the illustrated example, the sensor 5 is arranged entirely within an inner space of the second profile section, i.e., in the inner space delimited by the web 20 and the first and second side flanges 21, 22. In addition, the sensor 5 is arranged near the front end 15 of the second profile section, as may be seen particularly in FIGS. 3 and 5.

The detection sensor 5 may be a Hall effect sensor or an inductive proximity sensor, or any other sensor known in the art.

The sensor 5 comprises a connector 50 to which wires 51 are connected. The connector 50 extends in the longitudinal direction X inside the inner space of the second profile section, along with the wires 51, which are positioned below the web 20 of the second profile section; thus the sensor and its connection are fully protected from the outside environment, in particular from mechanical stress and, particularly, the risk of spilled fluids. The wires 51 join the wires of other harness elements belonging to the movable part of the seat, such as those of pre-tensioner igniters or other devices embedded in the seat.

As illustrated in FIGS. 5-7, the sensor 5 is able to detect the presence of the fixed motorization element 4 (the helical screw 4 in the illustrated example) when said sensor 5 is opposite at least a portion of the fixed motorization element 4. In the case in FIG. 5, a configuration is illustrated where the seat is in the forward position and, in this case, the sensor 5 is not opposite the fixed motorization element 4 and, therefore, detects no object opposite its sensitive part 52.

When the seat is moved backward, in particular by means of a motorization system, there is a middle position shown in FIG. 6 where the sensor 5 is opposite the front end of the fixed motorization element 4 and, therefore, in this position the sensor 5 detects a presence in particular of a metal element opposite its sensitive part 52; therefore the sensor transmits information to a control unit (not shown), which enables selecting the airbag volume that should be triggered in case of accident.

FIG. 7 illustrates a rearward position of the seat where the sensor 5 is located opposite a middle part of the fixed motorization element 4 and, therefore, also detects the presence of an object, in particular a metal object, and transmits information about that presence in the same way as before to the aforesaid control unit.

The sensor 5 thus detects characteristic information on the forward motion of the movable profile section of the slide rail. That information can be used as a setting for an airbag trigger system as mentioned above. In the example presented here, the information is binary, i.e., slide rail in the forward or backward position.

However, there may be more than two states detected by the sensor 5. For example, in the case of an analog sensor, where the tip of the helical screw 4 has a smaller diameter than its threaded body, there could be three states (screw not detected, tip of screw detected, body of screw detected). In addition, the screw could be equipped with marker elements, such as magnetic marker elements, to detect not only the presence of the screw, but also to know what portion of the screw is opposite the sensor, which makes it possible to deliver more information to the trigger system control unit.

Advantageously according to the invention, the longitudinal position detection system requires no additional parts other than the sensor 5, since the sensor directly detects the presence of the helical screw 4 without any other specific intermediate part, which optimizes the integration of the 'position detection' function.

In a simple implementation, the sensor can provide binary information on whether the helical screw 4 is opposite it. The position of the sensor 5 can be chosen to optimize the distribution between the portion of the path of the movable profile section 2 where the sensor does not detect the presence of the helical screw 4 and the complementary portion of the path where the sensor 5 does detect the position of the helical screw 4.

It should be noted that the sensor 5 may equip only one slide rail or may equip both slide rails of the motor vehicle seat. Likewise, the logic can be reversed and the sensor installed on the rear part of the movable profile section to detect the presence of the helical screw when the seat is in the forward position and not detect the helical screw 4 when the seat is in the rearmost position.

I claim:

1. A slide rail for motor vehicle seat, comprising:
   a first profile section, attached to said vehicle, extending along a longitudinal axis, said first profile section having a cross-section with a bottom and two side parts,
   a second profile section, guided translationally relative to the first profile section and that moves relative to said first profile section along the longitudinal axis, said second profile section having a cross-section with a central part with a U-shape open toward the bottom of the first profile section, having a web and first and second side flanges,
   a fixed motorization element connected to the first profile section, the fixed motorization element being a helical screw fixedly secured to the first profile section, wherein the helical screw is arranged at a distance from the bottom of the first profile section and the sensor comprises a sensitive part that detects the helical screw,
   a movable motorization element connected to the second profile section, cooperating with the fixed motorization element, the movable motorization element including one of a nut and pinion gear; and
   a sensor attached to the second profile section, said sensor that detects the presence of the fixed motorization element when said sensor is opposite a portion of the fixed motorization element.

2. The slide rail for motor vehicle seat according to claim 1, wherein the sensor is entirely contained within an inner space of the second profile section, said inner space being delimited by said web and the first and second side flanges.

3. The slide rail for motor vehicle seat according to claim 2, wherein the sensor is attached near the front end of the second profile section.

4. The slide rail for motor vehicle seat according to claim 3, wherein the movable motorization element is a captive nut rotated by a drive mechanism.

5. The slide rail for motor vehicle seat according to claim 1, wherein the sensor comprises a sensitive part that detects the upper portion of the helical screw.

6. The slide rail for motor vehicle seat according to claim 2, wherein the sensor is a Hall effect sensor or an inductive proximity sensor.

7. The slide rail for motor vehicle seat according to claim 1, wherein the sensor comprises a connection oriented in parallel to the longitudinal axis and wherein said connection is located within the inner space delimited by said web and the first and second side flanges.

8. A motor vehicle seat comprising at least one slide rail according to claim 1.

* * * * *